(12) United States Patent
Xu et al.

(10) Patent No.: US 10,341,413 B2
(45) Date of Patent: Jul. 2, 2019

(54) METHOD AND SYSTEM FOR SYNCHRONIZING ROBOT WITH SERVER

(71) Applicant: Hangzhou Yameilijia Technology Co., Ltd., Hangzhou (CN)

(72) Inventors: Juejing Xu, Hangzhou (CN); Jianqiang Zhu, Hangzhou (CN); Ming Ma, Hangzhou (CN)

(73) Assignee: Hangzhou Yameilijia Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/326,409

(22) PCT Filed: Aug. 3, 2016

(86) PCT No.: PCT/CN2016/093124
§ 371 (c)(1),
(2) Date: Jan. 13, 2017

(87) PCT Pub. No.: WO2017/118002
PCT Pub. Date: Jul. 13, 2017

(65) Prior Publication Data
US 2018/0302461 A1   Oct. 18, 2018

(30) Foreign Application Priority Data

Jan. 4, 2016   (CN) .......................... 2016 1 0005093
Jan. 4, 2016   (CN) .......................... 2016 1 0008091

(51) Int. Cl.
*H04L 29/08*   (2006.01)
*H04W 56/00*   (2009.01)
(Continued)

(52) U.S. Cl.
CPC .......... *H04L 67/025* (2013.01); *B25J 9/1689* (2013.01); *H04L 1/08* (2013.01); *H04L 67/1095* (2013.01); *H04W 56/0015* (2013.01)

(58) Field of Classification Search
CPC ..... H04L 67/025; H04L 67/1095; H04L 1/08; H04W 56/0015; B25J 9/1689
USPC ........................................................ 700/245
See application file for complete search history.

(56) References Cited

U.S. PATENT DOCUMENTS 5,887,143 A  *  3/1999  Saito ...................... G06F 8/458
                                                             709/200
6,769,032 B1 *  7/2004  Katiyar ................ G06F 16/951
                                                             709/246

(Continued)

*Primary Examiner* — Jaime Figueroa
(74) *Attorney, Agent, or Firm* — Schwegman Lundberg & Woessner, P.A.

(57) ABSTRACT

Provided are a method and system for synchronizing a robot with a server. The service sends a time service command including a current time of the server to the robot, and the robot receives the time service command, so as to enable time synchronization of the robot with the server. A control device receives first command data carrying a first timestamp sent from the server, and then determines whether the first timestamp in the first command data has expired. If the first timestamp has expired, the control device receives command data resent from the server until second command data carrying an unexpired second timestamp is received. Finally, the control device controls the robot to execute a corresponding action at a time corresponding to the second timestamp based on the second command data, so as to realize the synchronization of the robot with the command data sent from the server.

19 Claims, 4 Drawing Sheets

(51) Int. Cl.
*B25J 9/16* (2006.01)
*H04L 1/08* (2006.01)

(56) References Cited

U.S. PATENT DOCUMENTS

| | | | |
|---|---|---|---|
| 6,851,115 B1* | 2/2005 | Cheyer | G06F 9/465 719/317 |
| 8,565,689 B1* | 10/2013 | Rubin | H04B 17/382 455/67.11 |
| 8,874,266 B1* | 10/2014 | Francis, Jr. | G05B 23/0221 700/247 |
| 2002/0059558 A1* | 5/2002 | Hines | G06F 8/36 717/103 |
| 2003/0121027 A1* | 6/2003 | Hines | G06F 11/362 717/135 |
| 2004/0172448 A1* | 9/2004 | Kobayashi | H04L 12/1822 709/203 |
| 2006/0109376 A1* | 5/2006 | Chaffee | G05B 19/0423 348/423.1 |
| 2006/0161300 A1* | 7/2006 | Gonzalez-Banos | B25J 9/161 700/245 |
| 2006/0161301 A1* | 7/2006 | Kim | H04N 21/235 700/245 |
| 2006/0178776 A1* | 8/2006 | Feingold | G01N 35/0092 700/245 |
| 2007/0088775 A1* | 4/2007 | Asplund | H04L 67/1095 709/201 |
| 2008/0095196 A1* | 4/2008 | Weatherhead | G05B 19/41815 370/503 |
| 2009/0177306 A1* | 7/2009 | Bosga | B30B 1/266 700/103 |
| 2010/0073363 A1* | 3/2010 | Densham | G05B 17/02 345/419 |
| 2013/0103196 A1* | 4/2013 | Monceaux | A63F 9/183 700/253 |
| 2014/0289189 A1* | 9/2014 | Chan | G06F 9/54 707/610 |

* cited by examiner

METHOD AND SYSTEM FOR SYNCHRONIZING ROBOT WITH SERVER

This application is a U.S. National Stage Filing under 35 U.S.C. 371 from International Application No. PCT/CN2016/093124, filed on Aug. 3, 2016, which claims the benefit of priority to China. Patent Application No. 201610008091.2, filed on Jan. 4, 2016, and which claims the benefit of priority to China Patent Application No. 201610005093.6, filed on Jan. 4, 2016, each of which is hereby incorporated by reference herein in its entirety.

TECHNICAL FIELD

The present invention relates to the field of robot technologies, and in particular to a method and system for synchronizing a robot with a server.

BACKGROUND ART

With the rapid development of computer technologies and artificial intelligence technologies, it is expected that in the near future, robots will be one of the important industries that decide national competitiveness. Robots are widely used in various large-scale people and goods flow application scenarios, such as supermarkets, airports, stations, conference and exhibition centers, and logistics warehouses, and they work autonomously to assist in or replace human working. In the case that a lot of robots are gathered in a working area, each robot may be kept in a movement state; and if a server is to remotely control a robot to work, the server will send a command to the robot so as to control the movement state of the robot through the command. Meanwhile, the wireless network communication technology which is developed increasingly offers a convenient and stable communication means for robot remote control, and makes a real-time control under a complex environment become possible.

In a robot remote control method of the prior art, data transmission is performed between a server-side and a robot through wireless communication. As having outstanding advantages of a wide coverage range, large transmission bandwidth and fast transmission speed, a WIFI network is usually used for the data communication. In the above-mentioned remote control method, a control command sent from the server-side is transmitted to the robot via the WIFI network, and the robot (i.e., a terminal) then receives the control command and performs related operations such as command analysis and command execution, so as to make an action of the robot controlled.

The inventors have found from research that, in the prior art, the server can enable fixed-cycle operations of the robot or control the movement state of the robot, through command. However, in one aspect, the sending and reception of the command would be asynchronous due to asynchrony in time of the server and the robot, thereby resulting in asynchronous movements of the robots, which in turn would cause a collision among the robots. In the other aspect, in the robot remote control method, the WIFI network is adopted for the communication, but a network signal is susceptible to interference due to poor stability, there is therefore a problem of transmission delay of the command during the communication between the server-side and the robot, which causes the robot to be unable to execute a prescribed action at a prescribed time and accordingly causes a low work efficiency, and which further causes mutual interference between the actions of the robots which would go against coordinate work, accordingly, there is poor coordination ability.

DISCLOSURE OF THE INVENTION

In view of this, an object of the present invention is to provide a method and system for synchronizing a robot with a server, for solving the problem in the prior art that there is a collision among the robots due to asynchronous transmission and reception of the command between the server and the robot which is caused by the asynchrony in time of the server and the robot. Moreover, with the method and system, it is ensured that the robot can execute a prescribed action at a prescribed time according to an execution command from the server; the mutual interference among a plurality of robots caused by the transmission delay of the command is eliminated; and both the work efficiency of the robot and the ability of coordination among the robots are improved.

In a first aspect, embodiments of the present invention provide a method for synchronizing a robot with a server, which includes:
  sending by the server a time service command to the robot, the time service command including a current time of the server;
  receiving by the robot the time service command sent from the server;
  sending by the robot a response message to the server based on the time service command;
  receiving by the server the response message sent from the robot, and determining whether a time service for the robot is successful based on the response message;
  sending by the server a time service success message to the robot if the time service for the robot is successful;
  synchronizing by the robot with the server in terms of time, after the robot receives the time service success message sent from the server; and
  resending by the server the time service command to the robot if the time service for the robot is unsuccessful.

In combination with the first aspect, the embodiments of the present invention provide a first possible implementation of the first aspect, where the step of the server determining whether the time service for the robot is successful based on the response message includes:
  starting timing by the server, once the server sends the time service command to the robot; and
  determining by the server whether the response message sent from the robot is received within a first preset time, where if yes, it is determined that the time service for the robot is successful, or if no, it is determined that the time service for the robot is unsuccessful.

In combination with the first aspect, the embodiments of the present invention provide a second possible implementation of the first aspect, where after the robot receives the time service command sent from the server, the method further include:
  recording by the robot the current time of the server included in the time service command sent from the server;
  calculating by the robot a difference between the current time of the server and a time of the robot; and
  saving the difference by the robot.

In combination with the first aspect, the embodiments of the present invention provide a third possible implementation of the first aspect, where the method further includes:
  sending by the server the time service command to the robot at intervals of a second preset time.

In combination with the first aspect, the embodiments of the present invention provide a fourth possible implementation of the first aspect, where the method further includes:

sending to the server by the robot at intervals of a third preset time a standard time acquiring request including an address code of the robot, so that the server sends the current time of the server to the robot based on the standard time acquiring request.

In combination with the first aspect, the embodiments of the present invention provide a fifth possible implementation of the first aspect, where the robot includes a control device in communication connection with the server, the control device controls the robot to perform a command synchronization with the server, and the method further includes:

the control device receiving first command data carrying a first timestamp sent from the server, the first command data being configured to control the robot to execute a corresponding action at a time corresponding to the first timestamp;

determining whether the first timestamp in the first command data has expired;

receiving command data resent from the server until second command data carrying an unexpired second timestamp is received, if it is determined that the first timestamp has expired, where the second command data is configured to control the robot to execute a corresponding action at a time corresponding to the second timestamp; and controlling the robot to execute the corresponding action at the time corresponding to the second timestamp based on the second command data, so as to achieve synchronization of the robot with the command data sent from the server.

In combination with the first aspect, the embodiments of the present invention provide a sixth possible implementation of the first aspect, where the step of the control device receiving the second command data resent from the server if it is determined that the first timestamp has expired includes:

the control device sending, if it is determined that the first timestamp has expired, a first response command indicating that the first timestamp has expired to the server so that the server feeds back command data corresponding to the first response command;

receiving the second command data carrying the unexpired second timestamp resent from the server, where the second command data is generated by the server according to a current state of the robot, and the current state at least includes one or more of the following state information of the robot: position information, direction information and interaction information.

In combination with the first aspect, the embodiments of the present invention provide a seventh possible implementation of the first aspect, where the method further includes:

sending to the server a second response command indicating that the first timestamp has not expired, if the control device determines that the first timestamp has not expired.

In combination with the first aspect, the embodiments of the present invention provide an eighth possible implementation of the first aspect, where the method further includes:

receiving at a preset interval third command data carrying a third timestamp sent from the server, where the third command data is configured to control the robot to execute, at a time corresponding to the third timestamp, an action following an execution action corresponding to the first command data, and the third command data is command data, sent by the server, corresponding to the second response command.

In combination with the first aspect, the embodiments of the present invention provide a ninth possible implementation of the first aspect, where the step of determining whether the first timestamp in the first command data has expired includes:

acquiring the first timestamp in the first command data;

determining whether the first timestamp is later than a time displayed on the robot, where the time displayed on the robot is synchronized with a time displayed on the server;

determining that the first timestamp has expired if the first timestamp in the first command data is earlier than the time displayed on the robot; and determining that the first timestamp has not expired if the first timestamp in the first command data is later than the time displayed on the robot.

In a second aspect, the embodiments of the present invention further provide a system for synchronizing a robot with a server, which includes:

the robot configured to: receive a time service command sent from the server; send a response message to the server based on the time service command; and further configured to be synchronized with the server in terms of time, after receiving a time service success message sent from the server; and the server configured to: send to the robot the time service command including a current time of the server; and further configured to receive the response message sent from the robot, and determine whether the time service for the robot is successful based on the response message; and further configured to send the time service success message to the robot if the time service for the robot is successful, or resend the time service command to the robot if the time service for the robot is unsuccessful;

where the robot includes a control device in communication connection with the server, and the control device is configured to: receive first command data carrying a first timestamp sent from the server, the first command data being configured to control the robot to execute a corresponding action at a time corresponding to the first timestamp; determine whether the first timestamp in the first command data has expired, where if it is determined that the first timestamp has expired, command data resent from the server is received until second command data carrying an unexpired second timestamp is received, the second command data being configured to control the robot to execute a corresponding action at a time corresponding to the second timestamp; and control the robot to execute the corresponding action at the time corresponding to the second timestamp based on the second command data, so as to achieve synchronization of the robot with the command data sent from the server; and the server is further configured to: send the first command data carrying the first timestamp to the control device; and resend, if the first timestamp has expired, the second command data until the second timestamp carried by the sent second command data has not expired.

In combination with the second aspect, the embodiments of the present invention provide a first possible implementation of the second aspect, where the server includes:

a timing module configured to start timing once the time service command is sent to the robot; and a server determining module configured to determine whether the response message sent from the robot is received within a first preset time, where if yes, it is determined that the time service for the robot is successful, or if no, it is determined that the time service for the robot is unsuccessful.

In combination with the second aspect, the embodiments of the present invention provide a second possible implementation of the second aspect, where the robot further includes:
- a recording module configured to record the current time of the server included in the time service command sent from the server;
- a calculating module configured to calculate a difference between the current time of the server and a time of the robot; and
- a saving module configured to save the difference.

In combination with the second aspect, the embodiments of the present invention provide a third possible implementation of the second aspect, here the server further includes:
- a first sending module configured to send the time service command to the robot at intervals of a second preset time.

In combination with the second aspect, the embodiments of the present invention provide a fourth possible implementation of the second aspect, where the robot further includes:
- a second sending module configured to send, at intervals of a third preset time, a standard time acquiring request including an address code of the robot to the server, so that the server sends the current time of the server to the robot based on the standard time acquiring request.

In combination with the second aspect; the embodiments of the present invention provide a fifth possible implementation of the second aspect, where the control device includes:
- a receiving module configured to receive the first command data carrying the first timestamp sent from the server;
- a control device determining module configured to determine whether the first timestamp in the first command data received by the receiving module has expired;
- an expired command data analyzing module configured to receive the command data resent from the server until the second command data carrying the unexpired second timestamp is received, if the control device determining module determines that the first timestamp has expired; and
- a data synchronizing module configured to control the robot to execute the corresponding action at the time corresponding to the second timestamp based on the second command data obtained by analysis of the expired command data analyzing module, so as to achieve the synchronization of the robot with the command data sent from the server.

In combination with the second aspect, the embodiments of the present invention provide a sixth possible implementation of the second aspect, where the expired command data analyzing module includes:
- a first response command sending unit configured to send, if the control device determining module determines that the first timestamp has expired, to the server a first response command indicating that the first timestamp has expired so that the server feeds back command data corresponding to the first response command; and
- a second command data receiving unit configured to receive the second command data carrying the unexpired second timestamp resent from the server, where the second command data is generated by the server according to a current state of the robot, and the current state at least includes one or more of the following state information of the robot: position information, direction information and interaction information.

In combination with the second aspect, the embodiments of the present invention provide a seventh possible implementation of the second aspect, where the control device further includes an unexpired command data analyzing module, and the unexpired command data analyzing module includes:
- a second response command sending unit configured to send to the server a second response command indicating that the first timestamp has not expired, if the control device determining module determines that the first timestamp has not expired; and
- a third command data receiving unit configured to receive at a preset interval third command data carrying a third timestamp sent from the server, where the third command data is configured to control the robot to execute, at a time corresponding to the third timestamp, an action following an execution action corresponding to the first command data, and the third command data is command data, sent from the server, corresponding to the second response command sent from the second response command sending unit.

In combination with the second aspect, the embodiments of the present invention provide an eighth possible implementation of the second aspect, where the control device determining module includes:
- a first timestamp acquiring unit configured to acquire the first timestamp in the first command data received by the receiving module;
- a first timestamp determining unit configured to determine whether the first timestamp acquired by the first timestamp acquiring unit is later than a time displayed on the robot, where the time displayed on the robot is synchronized with a time displayed on the server;
- an expiration determining unit configured to determine that the first timestamp has expired if the first timestamp determining unit determines that the first timestamp in the first command data is earlier than the time displayed on the robot; and
- a non-expiration determining unit configured to determine that the first timestamp has not expired if the first timestamp determining unit determines that the first timestamp in the first command data is later than the time displayed on the robot.

In the method and system for synchronizing the robot with the server provided by the embodiments of the present invention, in one aspect, the server sends the time service command including the current time of the server to the robot, and the robot receives the time service command sent from the server, so as to enable time synchronization of the robot with the server. Furthermore, the control device included in the robot receives the first command data carrying the first timestamp sent from the server, and then determines whether the first timestamp in the first command data has expired; and if the first timestamp has expired, the control device receives command data resent from the server until the second command data carrying the unexpired second timestamp is received; and finally, the control device controls the robot to execute the corresponding action at the time corresponding to the second timestamp based on the second command data, so as to realize the synchronization of the robot with the command data sent from the server.

Therefore, different from the robot remote control of the prior art in which the commutation is established via the Wifi network with network signals susceptible to interference due to poor stability and thus asynchronization of the robot with the command from the server is caused, in the embodiments of the present invention, the control device determines whether the first timestamp in the first command data sent from the server has expired, and continues to receive the command data resent from the server until the second command data carrying the unexpired second timestamp is received if the first timestamp has expired; and therefore, it is ensured that the robot can be synchronized with the prescribed time set by the server and accordingly execute the prescribed action at the time, thereby improving the work efficiency of the robot and the ability of working coordination among the plurality of robots.

In order to make the above objects, features and advantages of the present invention more apparent and to be understood easily, detailed description will be provided hereinafter by way of preferred embodiments with reference to the accompanying drawings.

BRIEF DESCRIPTION OF DRAWINGS

In order to illustrate the technical solutions of embodiments of the present invention more clearly, drawings required for use in the embodiments will be introduced briefly below. It should be understood that the drawings below are merely illustrative of some embodiments of the present invention, and therefore should not be considered as limiting of its scope. For those skilled in the art, other relevant drawings could also be derived from these drawings without any inventive effort.

DESCRIPTION OF REFERENCE SIGNS OF MAIN ELEMENTS

Figure 1:
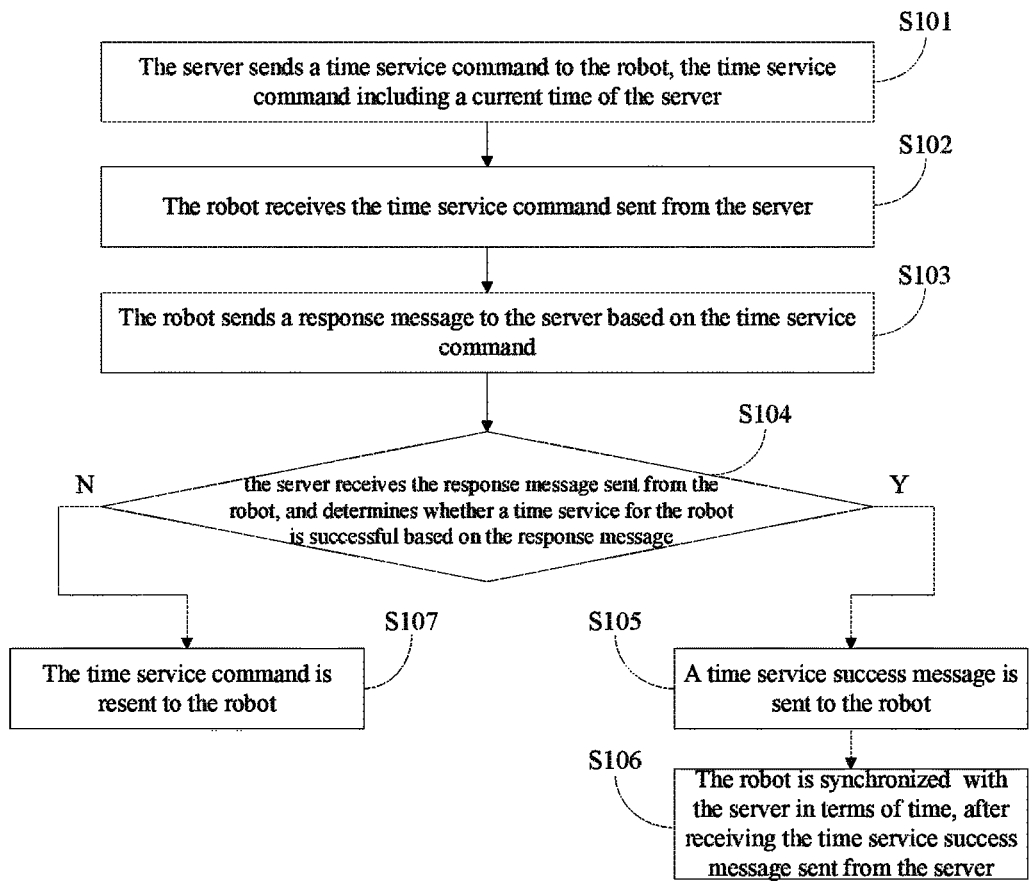
FIG. 1 shows a flowchart of a method for synchronizing a robot with a server provided by an embodiment of the present invention.

1 server; 2 robot; 10 receiving module; 20 control device determining module; 30 expired command data analyzing module; 40 data synchronizing module; 50 unexpired command data analyzing module; 201 first timestamp acquiring unit; 202 first timestamp determining unit; 203 expiration determining unit; 204 non-expiration determining unit; 301 first response command sending unit; 302 second command data receiving unit; 501 second response command sending unit; 502 third command data receiving unit.

DETAILED DESCRIPTION OF EMBODIMENTS

The technical solutions of the embodiments of the present invention will be described clearly and completely with reference to the drawings of the embodiments of the present invention. It is apparent that the embodiments described are some, but not all of the embodiments of the present invention. Generally, the components of the embodiments of the present invention, as described and illustrated in the drawings herein, may be arranged and designed in different configurations. Thus, the following detailed description of the embodiments of the present invention, as represented in the drawings, is not intended to limit the scope of the present invention as claimed, but is merely representative of selected embodiments of the present invention. All the other embodiments, obtained by those skilled in the art in light of the embodiments of the present invention without inventive efforts, will fall within the scope of the present invention as claimed.

As described above, in the prior art, there are problems as follows. In one aspect, when a server enables fixed-cycle operations of a robot or controls a movement state of the robot through a command, the sending and reception of the command would be asynchronous due to asynchrony in time of the server and the robot, thereby resulting in asynchronous movements of the robots which in turn would causes a collision among the robots. In the other hand, in the robot remote control method, a WIFI network is adopted for the communication, but a network signal is susceptible to interference due to poor stability, there is therefore a problem of transmission delay of the command during the communication between the server-side and the robot, which causes the robot to be unable to execute a prescribed action at a prescribed time and accordingly causes a low work efficiency, and which further causes mutual interference between the actions of the robots which would go against coordinate work, accordingly, there is poor coordination ability. Therefore, embodiments of the present invention provide a method and system for synchronizing a robot with a server, which enable time synchronization of the robot with the server, thereby ensuring that the robot can execute a prescribed action at a prescribed time, and improving both the work efficiency of the robot and the ability of coordination among multiple robots.

At first, the method for synchronizing a robot with a server will be set forth in detail below. Referring to FIG. 1, the embodiment of the present invention provides a method for synchronizing a robot with a server.

Firstly, a time service command is sent by the server to the robot, to realize the time synchronization of the server with the robot.

The server is provided thereon with a robot address code information list on which address codes of all the robots are stored. If there is a need for the server to send time service commands to some robots, the server may send the time service commands to these robots according to the address codes of them stored in the robot address code information list on the server.

Specifically, the robot address code information list on the server is generated as follows:
  the server receives a connection request sent from a robot, the connection request including an address code of the robot; and
  the server adds the address code of the robot to the robot address code information list, in this way, a robot address code information list including the address codes of all the robots is established on the server.

Here, the server and the robot may be connected via a wireless network, which may be WI-FI (Wireless-Fidelity) network, a 433 MHz dedicated network, or a 2.4G wireless network.

The method for synchronizing a robot with a server provided by an embodiment of the present invention specifically includes steps as follows.

S101, the server sends a time service command to the robot, the time service command including a current time of the server.

The server may establish a connection with the robot via a wireless network, and then the server may send to the robot a time service command including a current time of the server according to an address code of the robot stored in a robot address code information list on the server, so as to maintain the time synchronization of the server with the robot.

S102, the robot receives the time service command sent from the server.

After the server sends the time service command to the robot, the robot receives the time service command sent from the server. And after the robot receives the time service command sent from the server, the method further the following steps:
  recording by the robot the current time of the server included in the time service command sent from the server;
  calculating by the robot a difference between the current time of the server and a time of the robot; and
  saving by the robot the difference.

The time service command sent by the server to the robot in s the current time of the server. After receiving the time service command sent from the server, the robot records the current time of the server included in the time service command, compares the current time of the server with its own current time, calculates a difference between the current time of the server and the current time of the robot itself and saves the difference.

S103, the robot sends a response message to the server based on the time service command.

After receiving the time service command sent from the server, the robot sends a response message to the server. This is done for the following purposes: in one aspect, the server is informed that the robot has received the time service command sent from the server; and in another aspect, since the transmission of the time service command from the server to the robot takes an variable length of time due to influence from a wireless network signal between the server and the robot, the server may determine, based on the time when the response message sent from the robot is received, whether a time service for the robot is successful.

S104, the server receives the response message sent from the robot, and determines whether a time service for the robot is successful based on the response message, and if yes, S105 is executed, or if no, S107 is executed.

After receiving the time service command sent from the server, the robot sends a response message to the server. The server receives the response message sent from the robot and determines whether the time service for the robot is successful based on the response message, specifically, this may be done by the following steps:
  starting timing by the server once the server sends the time service command to the robot; and
  determining by the server whether the response message sent from the robot is received within a first preset time, where if yes, it is determined that the time service for the robot is successful, or if no, it is determined that the time service for the robot is unsuccessful.

Here, the first preset time may be a numerical value stored in the server and represents a range of allowable error.

The server sends the time service command to the robot, and the robot sends the response message to the server after receiving the time service command sent from the server. There is a certain time interval from the time when the server sends the time service command to the robot to the time when the server receives the response message sent from the robot, due to the influence from the wireless network signal between the server and the robot. If the time interval does not go beyond the range of allowable error, it is considered that the time service conducted by the server for the robot is successful. Sometimes, due to a poor or unstable wireless network signal between the server and the robot, the time interval from the time when the server sends the time service command to the robot to the time when the robot receives the time service command sent from the server is prolonged, which causes the time interval from the time when the server sends the time service command to the robot to the time when the server receives the response message sent from the robot to be prolonged; and then, when the robot receives the time service command sent from the server, the current time of the server included in the time service command would be not the same as the time of the server at an instant when the robot receives the time service command sent from the server, thereby resulting in an unsuccessful time service conducted by the server for the robot.

Hence, the server starts timing once it sends the time service command to the robot. It is determined that the time service conducted by the server for the robot is successful, if the response message sent from the robot is received by the server within the first preset time. Or, it is determined that the time service conducted by the server for the robot is unsuccessful, if no response message sent from the robot is received by the server within the first preset time.

S105, a time service success message is sent to the robot.

If the server receives the response message sent from the robot within the first preset time, it is determined that the time service conducted by the server for the robot is successful. In this case, the server sends a time service success message to the robot to notify the robot that the time service conducted by the server this time for the robot is successful.

S106, the robot is synchronized with the server in terms of time, after receiving the time service success message sent from the server.

After receiving the time service success message sent from the server, the robot adjusts its own clock based on the saved difference between the current time of the server and the current time of the robot. If the time of the server is later than the time of the robot, the robot is adjusted to be at a standard time by adding the difference to its own time, that is, the robot is adjusted to be synchronized with the server in time. If the time of the server is earlier than the time of the robot, the robot is also adjusted to be at a standard time by subtracting the difference from its own time, that is, the robot is adjusted to be synchronized with the server in time.

In this step, the robot is synchronized with the server in terms of time, by adding or subtracting the saved difference between the time.

S107, the time service command is resent to the robot.

The server starts timing once it sends the time service command to the robot. It is determined that the time service conducted by the server for the robot is unsuccessful, if the response message sent from the robot is not received by the server within the first preset time. In this case, the server resends the time service command to the robot.

The server sends the time service command to the robot at intervals of a second preset time, in order to maintain the time synchronization of the server with the robot.

Here, the second preset time is a preset numerical value stored in the server.

All of the above is introduced under a situation where the server conducts the time service for the robot actively, while the robot can only passively receive the time service command sent from the server, and can only receive the time service command sent from the server at intervals of the second preset time. However, there are many robots in the workplace, and clocks on each robot and the server are different from each other; and thus, after a long time working, the time of the robot and the server get asynchronous again, which would result in mutual collisions among the robots. However, in the case that the server can only send the time service command to the robot at intervals of the second preset time, during a period of time from one sending to the next of the time service command, collision among the robots would also be caused if time asynchrony between the robots occurs, that is because the time synchronization between the robots cannot be achieved since an interval of the second preset time has not been satisfied yet at that time.

Therefore, in the embodiment of the present invention, the robot sends, at intervals of a third preset time, a standard time acquiring request including an address code of the robot to the server, so that the server sends the current time of the server to the robot based on the standard time acquiring request.

Here, the third preset time is a preset numerical value stored in the robot.

The robot sends a standard time acquiring request including an address code of the robot to the server via the wireless network. After receiving the standard time acquiring request sent from the robot, the server sends to the robot the current time of the server which is the standard time. If the robot receives the current time of the server sent from the server within a fourth preset time, the robot records the current time of the server and stores it as the standard time, so that the time of the robot and the server is maintained consistent, that is, the time of the robot is synchronized successfully. If the robot receives no current time of the server sent from the server within the fourth preset time, the robot resends the standard time acquiring request to the server.

Here, the fourth preset time is a preset time value in the robot and represents a range of allowable error.

In the method for synchronizing the robot with the server provided by the embodiment of the present invention, the time service command including the current time of the server is sent from the server to the robot, and the robot receives the time service command sent from the server, so as to enable time synchronization of the robot with the server. Therefore, synchronous sending and reception of the command is ensured, and collisions among the robots are avoided.

Furthermore, the robot includes a control device in communication connection with the server. The control device controls the robot to perform a command synchronization with the server.

Figure 2:
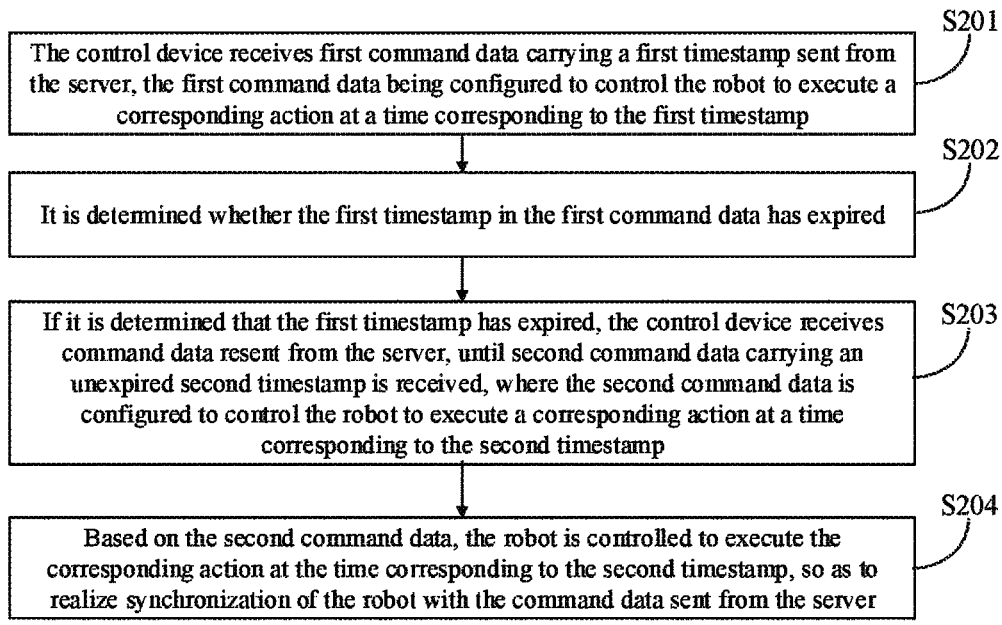
FIG. 2 shows a flowchart of a method for synchronizing a robot with a server provided by an embodiment of the present invention.

Specifically, as shown in FIG. 2, a flowchart of a method for synchronizing a robot and a server provided by an embodiment of the present invention is illustrated, where further steps are included as follows.

S201, the control device receives first command data carrying a first timestamp sent from the server, the first command data being configured to control the robot to execute a corresponding action at a time corresponding to the first timestamp.

Specifically, since there is a problem in the robot remote control method of the prior art that the robot is unable to execute a prescribed action at a prescribed time due to transmission delay of the command, and accordingly, there is a problem that the robot is not synchronized with the command from the server, in the embodiment of the present invention, the control device receives first command data carrying a first timestamp sent from the server. The first timestamp records an execution time of the first command data, and the first command data can control the robot to execute a corresponding action at a time corresponding to the first timestamp.

In addition, the first command data may include a control execution command for an instantaneous action that is sent from the server to a corresponding robot, or may also include a series of control execution commands including walking information, where the walking information includes information on actions corresponding to such as going straight, turning left and turning right.

S202, it is determined whether the first timestamp in the first command data has expired.

Specifically, before making the robot synchronized with the command from the server, the control device determines whether the first timestamp in the first command data has expired, which is performed correspondingly by comparing the execution time of the first command data recorded by the first timestamp with a time displayed on the robot itself, in order to assure the validity of the first timestamp in the first command data.

S203, if it is determined that the first timestamp has expired, the control device receives command data resent from the server, until second command data carrying an unexpired second timestamp is received, where the second command data is configured to control the robot to execute a corresponding action at a time corresponding to the second timestamp.

Specifically, if the execution time of the first command data recorded by the first timestamp is behind the time displayed on the robot itself, i.e., it is determined that the first timestamp has expired, the control device discards the entire first command data, and then continue to receive command data resent from the server until it receives second command data carrying an unexpired second timestamp.

Specifically, the second command data is configured to control the robot to execute a corresponding action at a time corresponding to the second timestamp. Here, the corresponding action that the second command data controls the robot to execute may be the same as or different from the corresponding action that the first command data controls the robot to execute. Whether the actions to be executed corresponding to the first and second command data being the same or not depends on a current state of the controlled robot. In addition, the second timestamp carried by the second command data is different from the first timestamp carried by the first command data. In the control method for synchronizing the robot with the server provided by the embodiment of the present invention, if the server knows that the first timestamp has expired, it resends the command data at a preset time interval until the second command data carrying the unexpired second timestamp is received, such that the real-time synchronization of the robot with the command from the server is ensured.

Specifically, the command data is a generalized concept, that is, the command data may be single command data corresponding to the first command data carrying the expired first timestamp, or may be a plurality of command data each corresponding to the first command data carrying the expired first timestamp. If the timestamp carried by the first command data has not expired, the server stops sending other command data corresponding to the first command data carrying the unexpired timestamp. If the timestamp carried by the first command data has expired, the server resends the command data corresponding to the first command data carrying the expired first timestamp in accordance with the current state of the controlled robot, until the control device determines that the second timestamp carried by the received second command data has not expired. Once the server knows that the second timestamp has not expired, it does not resend other command data corresponding to the second command data carrying the unexpired second timestamp. Then, the robot executes the corresponding action at the time corresponding to the unexpired second timestamp based on the second command data. Considering the randomness of delay of the command data, in the embodiment of the present invention, it is illustrated in the particularly described method by taking a case that the first communication is unsuccessful since the first command data received firstly by the control device has expired, and the second communication is successful since the second command data received secondly has not expired, as an example; however, for a case that the first communication is unsuccessful, the second communication is unsuccessful, . . . , and the N-th communication is successful, there is a similar principle of data synchronization to that of the method described above, which will not be repeated herein.

In addition, the second command data may also include a control execution command for an instantaneous action that is sent from the server to a corresponding robot, or may also include a series of control execution commands including walking information, where the walking information includes information on actions corresponding to such as going straight, turning left and turning right.

S204, based on the second command data, the robot is controlled to execute the corresponding action at the time corresponding to the second timestamp, so as to realize synchronization of the robot with the command data sent from the server.

Specifically, the control device controls, based on its received second command data carrying the unexpired second timestamp, the robot to execute the corresponding action at the time corresponding to the second timestamp, so as to realize synchronization of the robot with the command data sent from the server.

Here, the synchronization with the command data means that the robot can execute a controlled action indicated by the second command data sent from the server at the execution time recorded by the second timestamp. With the control method for synchronizing a robot with a command from a server provided by the embodiment of the present invention, even though the first timestamp in the first command data has expired, command data sent from the server can be received continually until the timestamp in the command data has not expired, and then the corresponding action can be performed. Here, the command data is a control command made by the server according to the current state of the robot in comprehensive consideration of the influence caused by other robots around this robot on its action. With the circulation mode as described above, the synchronization of the robot with the command from the server command is ensured.

Different from the robot remote control method of the prior art in which the commutation is established via the WIFI network with network signals susceptible to interference due to poor stability and thus asynchronization of the robot with the command from the server is caused, in the method for synchronizing the robot with the command from the server provided by the embodiment of the present invention, the control device determines whether the first timestamp in the first command data sent from the server has expired, and continues to receive the command data resent from the server until the second command data carrying the unexpired second timestamp is received if it is determined that the first timestamp has expired; and therefore, it is ensured that the robot can be synchronized with the prescribed time set by the server and accordingly execute the prescribed action at the time, thereby improving the work efficiency of the robot and the ability of working coordination among the plurality of robots.

Figure 3:
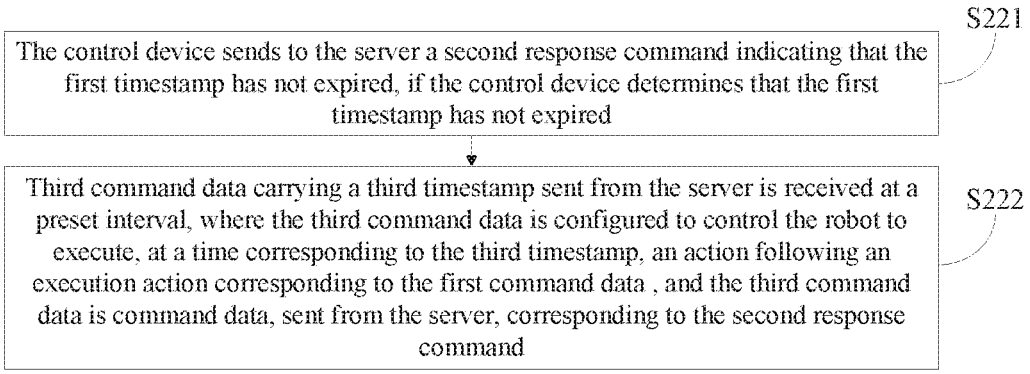
FIG. 3 shows a flowchart of a method for synchronizing a robot with a server provided by an embodiment of the present invention.

In order to enable the control device to further process the received first command data carrying the expired first timestamp, an expired command data analyzing method of the above-mentioned step S203 is specifically carried out by steps as follows. Referring to the flowchart as shown in FIG. 3, the method may further include steps as follows.

S211, the control device sends, if it is determined that the first timestamp has expired, to the server a first response command indicating that the first timestamp has expired so that the server feeds back command data corresponding to the first response command.

S212, the second command data carrying the unexpired second timestamp resent from the server is received; where the second command data is generated by the server according to the current state of the robot, and the current state at least includes one or more of the following state information of the robot: position information, direction information and interaction information.

Specifically, if the control device determines that the first timestamp has expired, it discards the first command data corresponding to the first timestamp and sends to the server a first response command indicating that the timestamp has expired. Then, the server receives the first response command, and determines that this data communication has failed from a response result corresponding to the response command. Based on a result of the determination, the server immediately resend to the robot command data which is a control command made by the server according to the current state of the robot in comprehensive consideration of the influence caused by other robots around this robot on its action. Finally, the control device receives the command data and determines whether the timestamp carried in the command data has expired until it receives the second command carrying the unexpired second timestamp, and then the server no longer sends the command data corresponding to the second command data carrying the unexpired second timestamp and the control device no longer receives it accordingly.

Here, considering that a main control device of the server which controls one or more robots would assign to all the controlled robots corresponding sub-control devices, that is, each sub-control device correspondingly controls a corresponding robot, the control method for synchronizing the robot with the command from the server provided by the embodiment of the present invention may control the synchronization of either one or more robots by the server. Therefore, after receiving the first response command sent from the robot, the server resends the command data to the corresponding robot currently sending the first response command in comprehensive consideration of current position information, direction information and inter-robot interaction information of all the robots, until the sent command data is the second command data carrying the unexpired second timestamp. Similarly, the second command data is also generated by the server in comprehensive consideration of the position information, the direction information and the inter-robot interaction information of all the related robots.

In addition, in the method for synchronizing the robot with the server provided by the embodiment of the present invention, a certain delay time may be set aside at a known point (e.g., turning) when the server sends the command data or the second command data, so that the method for command synchronization described above is more robust.

Figure 4:
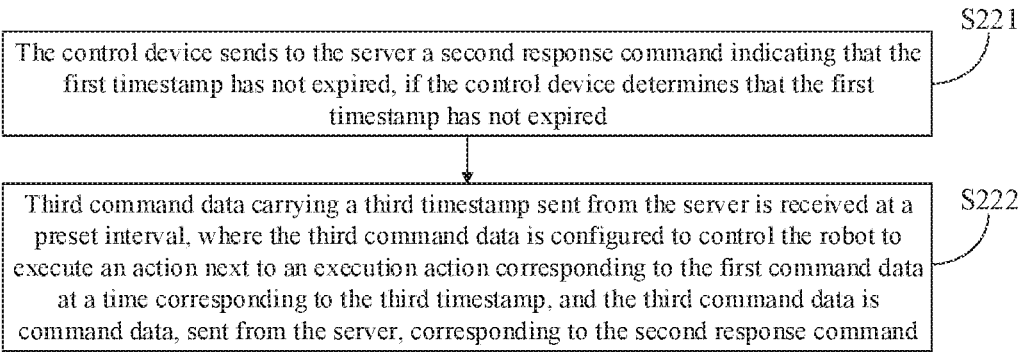
FIG. 4 shows a flowchart of a method for synchronizing a robot with a server provided by an embodiment of the present invention.

Correspondingly to the expired command data analyzing method described above, the method for synchronizing the robot with the command from the server provided by the embodiment of the present invention further includes an unexpired command data analyzing method, which is specifically carried out by the following steps. Referring to the flowchart as shown in FIG. 4, the method further includes steps as follows:

S221, the control device sends to the server a second response command indicating that the first timestamp has not expired, if the control device determines that the first timestamp has not expired.

S222, third command data carrying a third timestamp sent from the server is received at a preset interval, where the third command data is configured to control the robot to execute, at a time corresponding to the third timestamp, an action following an execution action corresponding to the first command data, and the third command data is command data, sent from the server, corresponding to the second response command.

Specifically, if the control device determines that the first timestamp has not expired, it sends to the server a second response command indicating that the timestamp has not expired. Then, the server receives the second response command and determines that this data communication has been successful from a response result corresponding to this response command. Based on a result of the determination, the server sends to the robot third command data at a preset time interval, where the third command data is configured to control the robot to execute, at a time corresponding to the third timestamp, an action following an execution action corresponding to the first command data, that is, the third command data is a next new command data in the case that the first command data has not expired. Similarly, the control device also determines for the third command data whether the third timestamp thereof has expired, and the specific determining method is similar to that used for determining whether the first timestamp in the first command data has expired, which will not be repeated herein.

In addition, the third command data may also be a control execution command for an instantaneous action that is sent from the server to a corresponding robot, or may also include a series of control execution commands including walking information, where the walking information includes information on actions corresponding to such as going straight, turning left and turning right.

Figure 5:
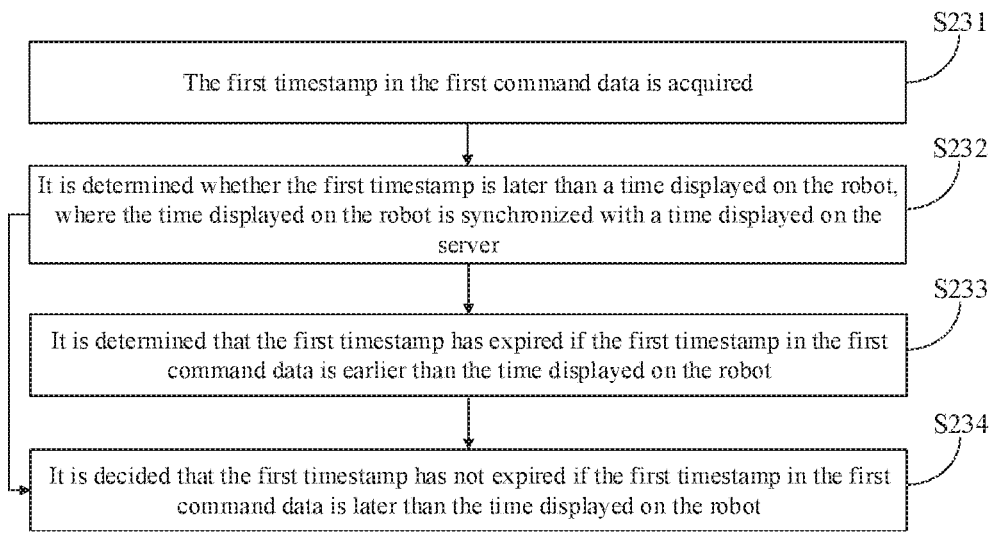
FIG. 5 shows a flowchart of a method for synchronizing a robot with a server provided by an embodiment of the present invention.

In the method for synchronizing the robot with the command from the server provided by the embodiment of the present invention, accurate time synchronization of the robot and the server which communicate in a same network is periodically performed, in order to ensure optimum performance of a relevant command data application in a network transmission method. The above-mentioned control method provided by the embodiment of the present invention is based on the determination of whether the first timestamp in the first command data has expired that is performed in the time synchronization described above. Referring to FIG. 5, the determining method specifically includes steps as follows.

S231, the first timestamp in the first command data is acquired.

S232, it is determined whether the first timestamp being later than a time displayed on the robot, where the time displayed on the robot is synchronized with a time displayed on the server.

Specifically, in the control flow provided by the embodiment of the present invention, the first timestamp in the first command data is firstly acquired, and then the first timestamp is compared with the time currently displayed on the robot. Here, the time currently displayed on the robot is synchronized with the time currently displayed on the server, and the first timestamp is a command execution time carried by the first command data sent from the server. Thus, with the comparison between the time information of the two, the determination of whether the communication is successful is more reliable.

S233, it is determined that the first timestamp has expired if the first timestamp in the first command data is earlier than the time displayed on the robot.

If the first timestamp in the first command data is earlier than the time displayed on the robot, that is, the displayed time corresponding to the reception of the first command data by the robot is ahead the execution time corresponding to the first command data, it is determined that the first timestamp has expired. Then, the corresponding action cannot be executed at the execution time corresponding to the first command data.

S234, it is determined that the first timestamp has not expired if the first timestamp in the first command data is later than the time displayed on the robot.

If the first timestamp in the first command data is later than the time displayed on the robot, that is, the execution time corresponding to the first command data is later than the displayed time corresponding to the reception of the first command data by the robot, it is determined that the first timestamp has not expired. Then, the robot waits for the execution time from the currently displayed time, to execute the corresponding action at the execution time corresponding to the first command data.

In the method for synchronizing the robot with the server provided by the embodiment of the present invention, the server sends the time service command including the current time of the server to the robot, and the robot receives the time service command sent from the server, so as to enable time synchronization of the robot with the server. Therefore, different from the robot remote control method of the prior art in which the commutation is established via the WIFI network with network signals susceptible to interference due to poor stability and thus asynchronization of the robot with the command from the server is caused, in the embodiment of the present invention, the control device determines whether the first timestamp in the first command data sent from the server has expired, and continues to receive the command data resent from the server until the second command data carrying the unexpired second timestamp is received if it is determined that the first timestamp has expired; and therefore, it is ensured that the robot can be synchronized with the prescribed time set by the server and accordingly execute the prescribed action at the time, thereby improving the work efficiency of the robot and the ability of working coordination among the plurality of robots.

Figure 6:
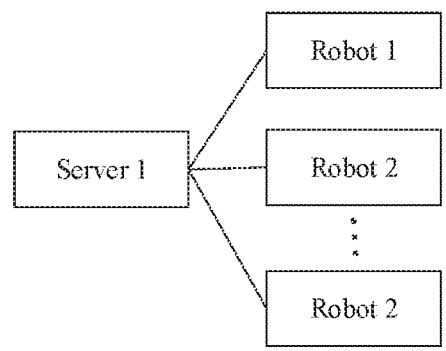
FIG. 6 shows a schematic structural view of a system for synchronizing a robot with a server provided by an embodiment of the present invention.

The embodiment of the present invention further provides a system for synchronizing a robot with a server, for executing the method of synchronizing the robot with the server described above. Referring to FIG. 6, the system includes a server 1 and a robot 2.

The robot 2 is configured to: receive a time service command sent from the server 1; send a response message to the server 1 based on the time service command; and further configured to be synchronized with the server 1 in terms of time, after receiving a time service success message sent from the server 1.

The server 1 is configured to: send to the robot 2 the time service command including a current time of the server 1; and further configured to receive the response message sent from the robot 2, and determine whether the time service for the robot 2 is successful based on the response message; and further configured to send a time service success message to the robot 2 if the time service for the robot 2 is successful, or resend the time service command to the robot 2 if the time service for the robot 2 is unsuccessful.

The robot 2 includes a control device in communication connection with the server 1. The control device is configured to: receive first command data carrying a first timestamp sent from the server 1, the first command data being configured to control the robot 2 to execute a corresponding action at a time corresponding to the first timestamp; determine whether the first timestamp in the first command data has expired, where if it is determined that the first timestamp has expired, command data resent from the server 1 is received until second command data carrying an unexpired second timestamp is received, where the second command data is configured to control the robot 2 to execute a corresponding action at a time corresponding to the second timestamp; and control the robot 2 to execute the corresponding action at the time corresponding to the second timestamp based on the second command data, so as to achieve synchronization of the robot 2 with the command data sent from the server 1.

The server 1 is further configured to: send the first command data carrying the first timestamp to the control device; and resend, if the first timestamp has expired, the second command data until the second timestamp carried by the sent second command data has not expired.

As shown in FIG. 6, the above-mentioned system includes a plurality of robots 2, where the term "plurality" refers to an arbitrary integer greater than 1; and the embodiment of the present invention does not t the specific number of the robots.

Here, the server 1 and the robot 2 may be connected via a wireless network; which may be WI-FI network, a 433 MHz dedicated network, or a 2.4G wireless network.

In the embodiment of the present invention, the server 1 sends to the robot 2 the time service command including the current time of the server 1. After receiving the time service command sent from the server 1, the robot 2 sends a response message to the server 1. After receiving the response message sent from the robot 2, the server 1 determines, based on the response message, whether the time service for the robot 2 is successful. If the time service for the robot 2 is successful, the server 1 sends the time service success message to the robot 2, and the robot 2 is synchronized with the server 1 in terms of time, after receiving the time service success message sent from the server 1. If the time service conducted by the server 1 for the robot 2 is unsuccessful, the server 1 will resend the time service command to the robot.

Here, as an embodiment, the server 1 may include a timing module and a server determining module.

The timing module is configured to start timing once the time service command is sent to the robot 2.

The server determining module is configured to determine whether the response message sent by the robot 2 is received within a first preset time, where if yes, it is determined that the time service for the robot 2 is successful, or if no, it is determined that the time service for the robot 2 is unsuccessful.

The timing module starts timing once the server 1 sends the time service command to the robot 2. After receiving the time service command sent from the server 1, the robot 2 sends the response message to the server 1. The server determining module determines whether the response message sent from the robot 2 is received by the server 1 within a first preset time, and determines that the time service for the robot 2 is successful if the response message sent from the robot 2 is received by the server 1 within the first preset time, or determines that the time service for the robot 2 is unsuccessful if no response message sent from the robot 2 is received by the server 1 within the first preset time, where in the latter case, the server 1 resends the time service command to the robot 2.

Here, as an embodiment, the robot 2 may include a recording module, a calculating module and a saving module.

The recording module is configured to record the current time of the server 1 included in the time service command sent from the server 1.

The calculating module is configured to calculate a difference between the current time of the server 1 and a time of the robot 2.

The saving module is configured to save the difference.

In the embodiment of the present invention, the server 1 sends to the robot 2 the time service command including the current time of the server 1. After the robot 2 receives the time service command sent from the server 1, the recording module in the robot 2 records the current time of the server 1, the calculating module calculates a difference between the recorded current time of the server 1 and the time of the robot 2, and the difference is sent to the saving module to be saved.

Here, as an embodiment, the server 1 may further include a first sending module.

The first sending module is configured to send the time service command to the robot 2 at intervals of a second preset time.

After the time service conducted by the server 1 for the robot 2 is successful, the server 1 sends the time service success message to the robot 2. After receiving the time service success message sent from the server 1, the robot 2 adjusts its own clock based on the saved difference, so that the time of the robot itself is synchronized with the time of the server 1, and in this case, the server 1 and the robot 2 have the same time. However, due to different clocks on the server 1 and the robot 2, the time of the server 1 and the robot 2 may get asynchronous again after a certain time interval. Therefore, the first sending module in the server 1 sends the time service command to the robot 2 at intervals of the second preset time.

Here, as an embodiment, the robot 2 may further include a second sending module.

The second sending module is configured to send, at intervals of a third preset time, a standard time acquiring request including an address code of the robot 2 to the server 1, so that the server 1 sends the current time of the server 1 to the robot 2 based on the standard time acquiring request.

In the embodiment of the present invention, besides passively receiving the time service command sent from the server 1, the robot 2 may actively send the standard time acquiring request to the server 1 at intervals of the third preset time through the second sending module, where the standard time is the current time of the server 1. After receiving the standard time acquiring request sent from the second sending module, the server 1 sends its current time to the robot 2. If the robot 2 receives the current time of the server 1 sent from the server 1 within a fourth preset time, the robot 2 records this time and saves it as a standard time, so as to enable the time synchronization of the server 1 with the robot 2. If the robot 2 receives no current time of the server 1 sent from the server 1 within the fourth preset time, the robot 2 reseals the standard time acquiring request to the server 1.

Figure 7:
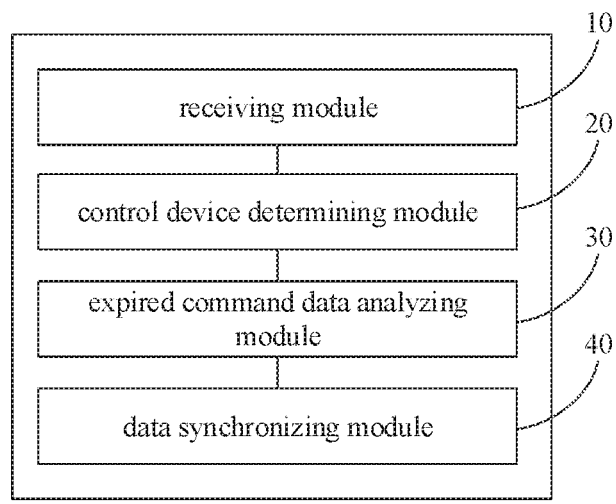
FIG. 7 shows a schematic structural view of a control device provided by an embodiment of the present invention.

Further, referring to FIG. 7, the control device includes:
  a receiving module 10 configured to receive the first command data carrying the first timestamp sent from the server, where the first command data is configured to control the robot to execute the corresponding action at the time corresponding to the first timestamp;
  a control device determining module 20 configured to determine whether the first timestamp in the first command data received by the receiving module 10 has expired;
  an expired command data analyzing module 30 configured to receive the command data resent from the server until the second command data carrying the unexpired second timestamp is received, if the control device determining module 20 determines that the first timestamp has expired, where the second command data is configured to control the robot to execute the corresponding action at the time corresponding to the second timestamp; and
  a data synchronizing module 40 configured to control the robot to execute the corresponding action at the time corresponding to the second timestamp based on the second command data obtained by analysis of the expired command data analyzing module 30, so as to achieve synchronization of the robot 2 with the command data sent from the server 1.

Here, the first command data and the second command data each may be a control execution command for an instantaneous action that is sent by the server to a corresponding robot, or a series of control execution commands including walking information, where the walking information includes information on actions corresponding to such as going straight, turning left and turning right.

Figure 8:
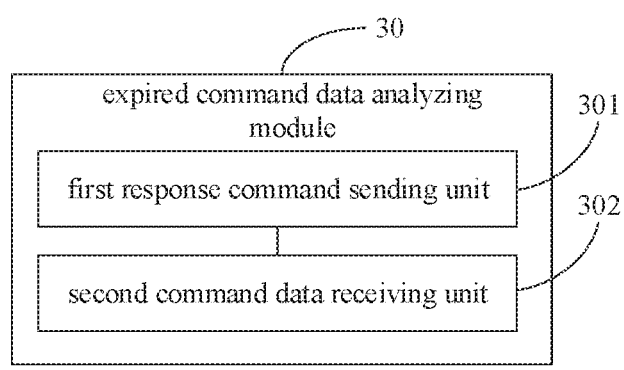
FIG. 8 shows a schematic structural view of an expired command data analyzing module in the control device provided by an embodiment of the present invention.

In order to enable the control device to further process the received first command data carrying the expired first timestamp, referring to FIG. 8, the expired command data analyzing module 30 includes a first response command sending unit 301 and a second command data receiving unit 302.

The first response command sending unit 301 is configured to send, if the control device determining module 20 determines that the first timestamp has expired, to the server 1 a first response command indicating that the first timestamp has expired so that the server feeds back command data corresponding to the first response command.

The second command data receiving unit 302 is configured to receive the second command data carrying the unexpired second timestamp resent from the server, where the second command data is generated by the server according to a current state of the robot, and the current state at least includes one or more of the following state information of the robot: position information, direction information and interaction information.

Figure 9:
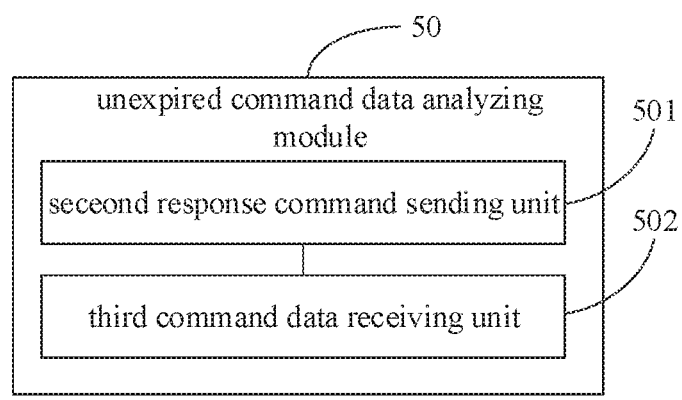
FIG. 9 shows a schematic structural view of an unexpired command data analyzing module in the control device provided by an embodiment of the present invention.

Correspondingly to the expired command data analyzing module 30, the control device provided by the embodiment of the present invention further includes an unexpired command data analyzing module 50 for analyzing unexpired command data. Referring to FIG. 9, the unexpired command data analyzing module includes a second response command sending unit 501 and a third command data receiving unit 502.

The second response command sending unit 501 is configured to send to the server a second response command indicating that the first timestamp has not expired, if the control device determining module 20 determines that the first timestamp has not expired. The third command data receiving unit 502 is configured to receive at a preset interval third command data carrying a third timestamp sent from the server. The third command data is configured to control the robot to execute, at a time corresponding to the third timestamp, an action following an execution action corresponding to the first command data, and the third command data is command data, sent from the server, corresponding to the second response command sent from the second response command sending unit 501.

Figure 10:
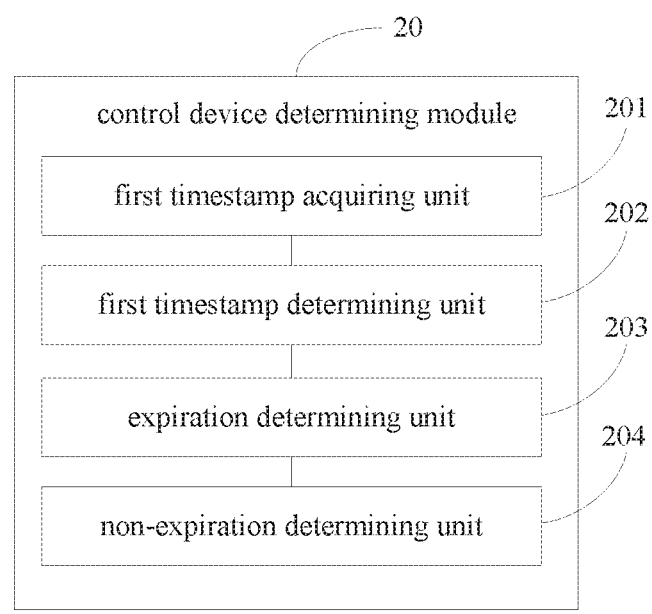
FIG. 10 shows a schematic structural view of a control device determining module in the control device provided by an embodiment of the present invention.

With the control device provided by the embodiment of the present invention, accurate time synchronization of the robot and the server which communicate in a same network is periodically performed, in order to ensure optimum performance of a relevant command data application in a network transmission method. The control device determining module 20 of the above-mentioned control device provided by the embodiment of the present invention is based on the determination of whether the first timestamp in the first command data has expired that is performed in the time synchronization described above. Referring to FIG. 10, the control device determining module 20 includes:
  a first timestamp acquiring unit 201 configured to acquire the first timestamp in the first command data received by the receiving module 10;
  a first timestamp determining unit 202 configured to determine whether the first timestamp acquired by the first timestamp acquiring unit 201 is later than the time displayed on the robot, where the time displayed on the robot is synchronized with the time displayed on the server;
  an expiration determining unit 203 configured to determine that the first timestamp has expired if the first timestamp determining unit 202 determines that the first timestamp in the first command data is earlier than the time displayed on the robot; and
  a non-expiration determining unit 204 configured to determine that the first timestamp has not expired if the first timestamp determining unit 202 determines that the first timestamp in the first command data is later than the time displayed on the robot.

In the system for synchronizing the robot with the server provided by the embodiment of the present invention, the server sends the time service command including the current time of the server to the robot, and the robot receives the time service command sent from the server, so as to enable time synchronization of the robot with the server. Therefore, different from the robot remote control of the prior art in which the commutation is established via the WIFI network with network signals susceptible to interference due to poor stability and thus asynchronization of the robot with the command from the server is caused, in the embodiment of the present invention, the control device determines whether the first timestamp in the first command data sent from the server has expired, and continues to receive the command data resent from the server until the second command data carrying the unexpired second timestamp is received if it is determined that the first timestamp has expired; and therefore, it is ensured that the robot can be synchronized with the prescribed time set by the server and accordingly execute the prescribed action at the time, thereby improving the work efficiency of the robot and the ability of working coordination among the plurality of robots.

An embodiment of the present invention provides a computer program product for implementation of the method for synchronizing the robot with the server includes a computer readable storage medium on which program codes stored. Commands included in the program codes may be used to execute the method described in the foregoing process embodiments, and the specific implementation thereof may refer to the process embodiments, which will not be repeated here.

It will be clearly appreciated by those skilled in the art that, for the convenience and brevity of the description, specific working procedures of the system, device and units described above may refer to the corresponding procedures in the foregoing process embodiments, which will not be repeated herein.

It should be understood that, in the several embodiments provided in the present application, the disclosed system, device and method may be implemented in other ways. The device embodiment described above is merely illustrative in nature. For example, the units is divided only in accordance with logical functions, and they may also be divided in other ways in practical implementations. For another example, multiple units or components may be combined or integrated into another system, or some features may be omitted or not executed. In addition, the mutual or direct coupling or communication connection illustrated or discussed herein may be indirect coupling or communication connection via some communication interfaces, devices or units, and may be electronic, mechanical or in other forms.

The units described as separate components may or may not be separated physically. The components illustrated as units may or may not be physical units, namely, they may be located at one place or may also be distributed onto multiple network units. Part or all of the units may be selected according to actual requirements, to fulfill the objects of the technical solutions of the embodiments.

Besides, the individual functional units in each embodiment of the present invention may be integrated into one processing unit, or may also be physically stand-alone, or two or more of them may be integrated into one unit.

When being implemented in the form of a software functional unit and sold or used as a stand-alone product, the functions may be stored in a computer-readable storage medium. Based on such understanding, the technical solution of the present invention may have a part thereof, that is essential or contributes to the prior art, or parts of the technical solution may be embodied in the form of a software product. The computer software product is stored in a storage medium, which includes several commands for enabling a computer device (which may be a personal computer, a server, a network device or the like) to execute all or part of the steps of the method described in each embodiment of the present invention. The aforesaid storage medium includes a USB flash disk, a mobile hard disk, a read-only memory (ROM), a random access memory (RAM), a magnetic disk or an optical disk or various media capable of storing program codes.

The foregoing is merely illustrative of particular implementations of the present invention, but not intended to limit the scope of protection of the present invention. Any variations or alternations, that would readily occur to those skilled in the art without departing from the technical scope disclosed in the present invention, shall fall within the scope of protection of the present invention. Therefore, the scope of protection of the present invention is to be determined by the appended claims.

The invention claimed is:

1. A method for synchronizing a robot with a server, comprising:
   sending by the server a time service command to the robot, the time service command comprising a current time of the server;
   receiving by the robot the time service command sent from the server;
   sending by the robot a response message to the server based on the time service command;
   receiving by the server the response message sent from the robot, and determining whether a time service for the robot is successful based on the response message;
   sending by the server a time service success message to the robot, if the time service for the robot is successful;
   synchronizing the robot with the server in terms of time, after the robot receives the time service success message sent from the server; and
   resending by the server the time service command to the robot if the time service for the robot is unsuccessful.

2. The method according to claim 1, wherein the step of the server determining whether the time service for the robot is successful based on the response message comprises:
   starting timing by the server, once the server sends the time service command to the robot; and
   determining by the server whether the response message sent from the robot is received within a first preset time, wherein if yes, it is determined that the time service for the robot is successful, or if no, it is determined that the time service for the robot is unsuccessful.

3. The method according to claim 1, wherein after the robot receives the time service command sent from the server, the method further comprises:
   recording by the robot the current time of the server included in the time service command sent from the server;
   calculating by the robot a difference between the current ti of the server and a time of the robot; and
   saving the difference by the robot.

4. The method according to claim 1, wherein the method further comprises:
   sending by the server the time service command to the robot at intervals of a second preset time.

5. The method according to claim 1, wherein the method further comprises:
   sending to the server by the robot at intervals of a third preset time a standard time acquiring request including an address code of the robot, so that the server sends the current time of the server to the robot based on the standard time acquiring request.

6. The method according to claim 1, wherein the robot comprises a control device in communication connection with the server, the control device controls the robot to perform a command synchronization with the server, and the method further comprises:
the control device receiving first command data carrying a first timestamp sent from the server, the first command data being configured to control the robot to execute a corresponding action at a time corresponding to the first timestamp;
determining whether the first timestamp in the first command data has expired;
receiving command data resent from the server until second command data carrying an unexpired second timestamp is received, if it is determined that the first timestamp has expired, wherein the second command data is configured to control the robot to execute a corresponding action at a time corresponding to the second timestamp; and
controlling the robot to execute the corresponding action at the time corresponding to the second timestamp based on the second command data, so as to achieve synchronization of the robot with the command data sent from the server.

7. The method according to claim 6, wherein the step of the control device receiving the second command data resent from the server if it is determined that the first timestamp has expired comprises:
the control device sending, if it is determined that the first timestamp has expired, a first response command indicating that the first timestamp has expired to the server so that the server feeds back command data corresponding to the first response command; and
receiving the second command data carrying the unexpired second timestamp resent from the server, wherein the second command data is generated by the server according to a current state of the robot, and the current state at least comprises one or more of the following state information of the robot: position information, direction information, and interaction information.

8. The method according to claim 6, wherein the method further comprises:
sending to the server a second response command indicating that the timestamp has not expired, if the control device determines that the first timestamp has not expired.

9. The method according to claim 6, wherein the method further comprises:
receiving, at a preset interval, third command data carrying a third timestamp sent from the server, wherein the third command data is configured to control the robot to execute, at a time corresponding to the third timestamp, an action following an execution action corresponding to the first command data, and the third command data is command data, sent by the server, corresponding to the second response command.

10. The method according to claim 6, wherein the step of determining whether the first timestamp in the first command data has expired comprises:
acquiring the first timestamp in the first command data;
determining whether the first timestamp is later than a time displayed on the robot, wherein the time displayed on the robot is synchronized with a time displayed on the server;

determining that the first timestamp has expired if the first timestamp in the first command data is earlier than the time displayed on the robot; and
determining that the first timestamp has not expired if the first timestamp in the first command data is later than the time displayed on the robot.

11. A system for synchronizing a robot with a server, comprising:
the robot configured to: receive a time service command sent from the server; send a response message to the server based on the time service command; and further configured to be synchronized with the server in terms of time after receiving a time service success message sent from the server; and
the server configured to: send to the robot the time service command comprising a current time of the server; and further configured to receive the response message sent from the robot, and determine whether the time service for the robot is successful based on the response message; and further configured to send the time service success message to the robot if the time service for the robot is successful, or resend the time service command to the robot if the time service for the robot is unsuccessful;
wherein the robot comprises a control device in communication connection with the server, and the control device is configured to: receive first command data carrying a first timestamp sent from the server, the first command data being configured to control the robot to execute a corresponding action at a time corresponding to the first timestamp; determine whether the first timestamp in the first command data has expired, wherein if it is determined that the first timestamp has expired, command data resent from the server is received until second command data carrying an unexpired second timestamp is received, the second command data being configured to control the robot to execute a corresponding action at a time corresponding to the second timestamp; and control the robot to execute the corresponding action at the time corresponding to the second timestamp based on the second command data, so as to achieve synchronization of the robot with the command data sent from the server; and
the server is further configured to: send the first command data carrying the first timestamp to the control device; and resend, if the first timestamp has expired, the second command data until the second timestamp carried by the sent second command data has not expired.

12. The system according to claim 11; wherein the server comprises:
a timing module configured to start timing once the time service command is sent to the robot; and
a server determining module configured to determine whether the response message sent from the robot is received within a first preset time, wherein if yes, it is determined that the time service for the robot is successful, or if no, it is determined that the time service for the robot is unsuccessful.

13. The system according to claim 11, wherein the robot further comprises:
a recording module configured to record the current time of the server included in the time service command sent from the server;
a calculating module configured to calculate a difference between the current time of the server and a time of the robot; and
a saving module configured to save the difference.

14. The system according to claim 11, wherein the server further comprises:
- a first sending module configured to send the time service command to the robot at intervals of a second preset time.

15. The system according to claim 11, wherein the robot further comprises:
- a second sending module configured to send, at intervals of a third preset time, a standard time acquiring request including an address code of the robot to the server, so that the server sends the current time of the server to the robot based on the standard time acquiring request.

16. The system according to claim 11, wherein the control device comprises:
- a receiving module configured to receive the first command data carrying the first timestamp sent from the server;
- a control device determining module configured to determine whether the first timestamp in the first command data received by the receiving module has expired;
- an expired command data analyzing module configured to receive the command data resent from the server until the second command data carrying the unexpired second timestamp is received, if the control device determining module determines that the first timestamp has expired; and
- a data synchronizing module configured to control the robot to execute the corresponding action at the time corresponding to the second timestamp based on the second command data obtained by analysis of the expired command data analyzing module, so as to achieve the synchronization of the robot with the command data sent from the server.

17. The system according to claim 16, wherein the expired command data analyzing module comprises:
- a first response command sending unit configured to send, if the control device determining module determines that the first timestamp has expired, to the server a first response command indicating that the first timestamp has expired so that the server feeds back command data corresponding to the first response command; and
- a second command data receiving unit configured to receive the second command data carrying the unexpired second timestamp resent from the server, wherein the second command data is generated by the server according to a current state of the robot, and the current state at least comprises one or more of the following state information of the robot: position information, direction information and interaction information.

18. The system according to claim 16, wherein the control device further comprises an unexpired command data analyzing module, and the unexpired command data analyzing module comprises:
- a second response command sending unit configured to send to the server a second response command indicating that the first timestamp has not expired, if the control device determining module determines that the first timestamp has not expired; and
- a third command data receiving unit configured to receive, at a preset interval, third command data carrying a third timestamp sent from the server, wherein the third command data is configured to control the robot to execute, at a time corresponding to the third timestamp, an action following an execution action corresponding to the first command data, and the third command data is command data, sent from the server, corresponding to the second response command sent from the second response command sending unit.

19. The system according to claim 16, wherein the control device determining module comprises:
- a first timestamp acquiring unit configured to acquire the first timestamp in the first command data received by the receiving module;
- a first timestamp determining unit configured to determine whether the first timestamp acquired by the first timestamp acquiring unit is later than a time displayed on the robot, wherein the time displayed on the robot is synchronized with a time displayed on the server;
- an expiration determining unit configured to determine that the first timestamp has expired if the first timestamp determining unit determines that the first timestamp in the first command data is earlier than the time displayed on the robot; and
- a non-expiration determining unit configured to determine that the first timestamp has not expired if the first timestamp determining unit determines that the first timestamp in the first command data is later than the time displayed on the robot.

* * * * *